June 9, 1942.   E. MOEN   2,285,753
ADJUSTABLE TAIL STOCK
Filed Dec. 21, 1939
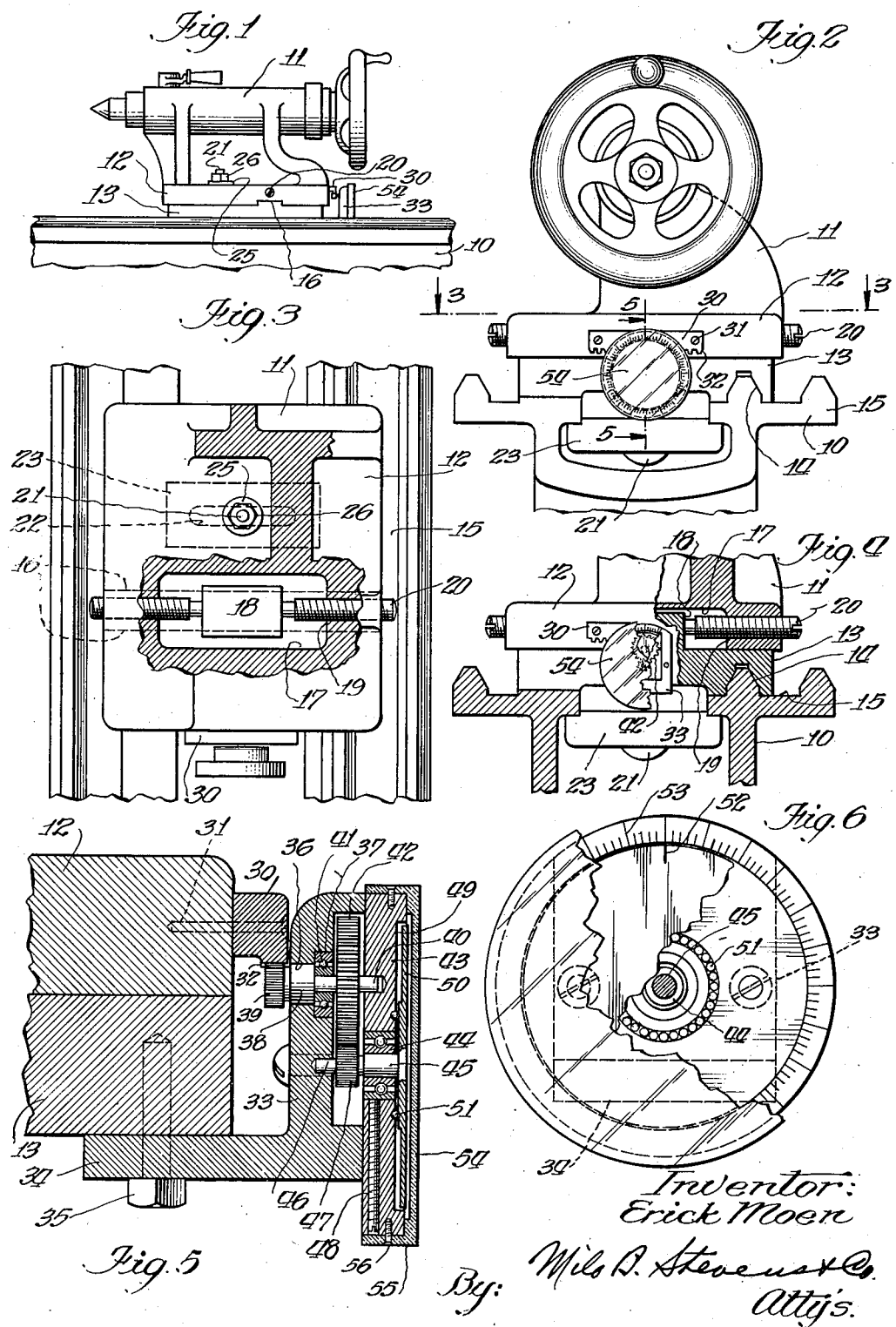
Inventor:
Erick Moen
By: Wils B. Stevens & Co.
Atty's.

Patented June 9, 1942

2,285,753

UNITED STATES PATENT OFFICE 2,285,753

ADJUSTABLE TAIL STOCK

Erick Moen, Chicago, Ill.

Application December 21, 1939, Serial No. 310,449

2 Claims. (Cl. 82—31)

My invention relates to the tail stocks of lathes and like machines, and more particularly to means for adjusting the tail stock laterally, and my main object is to provide a simple attachment which will enable the tail stock to be adjusted with a high degree of accuracy.

A further object of the invention is to provide a geared indicator having a wide latitude of travel to represent extremely small lateral movements of the tail stock, so that very fine degrees of tail stock adjustment may be easily made and determined.

Another object of the invention is to design the novel attachment as an independent unit to cooperate with the conventional mechanism employed for the lateral adjustment of the tail stock.

An additional object of the invention is to provide an indicator which is in a position handy for a clear view while the tail stock adjustment is made, and is plainly readable.

An important object of the invention is to design the novel attachment along lines of economy and durability.

With the above objects in view, and any others which may suggest themselves from the description to follow, a better understanding of the invention may be had by reference to the accompanying drawing, in which—

Fig. 1 is a side elevation of the improved tail stock, with a fragment of the lathe to which it relates shown;

Fig. 2 is an enlarged right-hand end view of the showing in Fig. 1;

Fig. 3 is a section on the line 3—3 of Fig. 2, partly broken away;

Fig. 4 is a duplication of a portion of Fig. 2 with certain parts removed or in section;

Fig. 5 is an enlarged section on the line 5—5 of Fig. 2; and

Fig. 6 is a face view of Fig. 5 from the right, with portions broken away.

Referring specifically to the drawing, 10 shows the bed of the lathe or other machine to which the tail stock is applied. The tail stock is indicated at 11, the same having an enlarged bottom 12 which is mounted on a base 13, the latter making a slide joint 14 with the ways 15 of the bed 10.

According to the conventional practice, the tail stock 11 is formed with a slide joint 16 between its bottom 12 and the base 13 in order that the tail stock may be laterally adjustable along such base. As more clearly seen in Fig. 4, the tail stock bottom is recessed from below as indicated at 17 to permit a block 18 to project upwardly from the base 13 into the recess, the block being considerably narrower than the recess. The side portions of the bottom 12 are horizontally tapped in alinement, as indicated at 19, for the application of screws 20 in an inward direction to meet the ends of the block 18. It is easily apparent from Fig. 3 that the screws 20 may be advanced or retracted in relation to each other to adjust the tail stock laterally in respect to the block 18. The above adjustment is fixed by means of a bolt 21 which is first passed upwardly through a long slot 22 in a block 23 disposed under the lathe bed 10. The bolt continues upwardly through a slot 24 in the base 13 which is of a width equal to that of the slot 22. The bolt then rises through a perforation in the tail stock bottom 12 to receive a washer 25 and a securing nut 26. It will be apparent that the tail stock carries the bolt 21 with it when laterally moved, the slots 22 and 24 affording traveling clearance for the bolt. However, when the lateral adjustment has been fixed by the setting of the screws 20, the tightening of the nut 26 will make the adjustment permanent.

The novel attachment primarily involves a block 30 which is applied horizontally to the outer end of the tail stock bottom 12 and secured thereto by screws 31. The block has a gear-rack formation 32 on the bottom.

The base 13 receives a cast receptacle 33 at its end, the receptacle being shown with a foot 34 which receives bolts 35 to secure it to the said base. However, the receptacle may be secured by bolts or other fastening means directly to the end of the base if desired.

The receptacle 33 is formed with a small transverse bore 36 which opens toward the right into a larger bore 37. In the bore 36 is freely disposed a shaft 38 which carries a spur pinion 39 in a position to mesh with the gear-rack formation 32 of the block 30. The shaft 38 is reduced toward the right with a spindle 40 which carries a ball bearing 41 disposed in the bore enlargement 37. The medial part of the spindle 40 carries a spur gear 42; and the outer end of the spindle is journaled in a plate 43 forming a closure for the receptacle 33.

The plate 43 is fitted with a ball bearing 44 at a point below the spindle 40 in order to journal a shaft 45 extended in a left-hand direction with a spindle 46. The latter carries a spur pinion 47 in mesh with the gear 42. The plate 43 is circular, extending below and laterally of the receptacle 33; and the bottom of the plate receives a set-screw 48 leading to the outer element of the bearing 44 in order to fasten the same.

The plate 43 is recessed a short distance from its rim as indicated at 49 to form a shallow circular cavity for a dial 50 which is rigidly mounted on the outer end of the shaft 45 or made in one piece therewith. As the dial is intended for rapid rotation at times, it is backed by a ball bearing 51 between its inner face and the outer face of the plate 43, such bearing relieving the dial of end-thrust or friction. The dial has an origin mark 52 relative to a circular series of calibrations 53 on the outer face of the plate 43 adjacent to its periphery. In order that the dial 50 may not be subject to displacement or injury by the hands or other objects coming in contact with it, a glass or Lucite cover 54 is provided for it, the rim 55 of the cover being secured by screws 56 to the periphery of the plate 43.

It will be apparent that lateral adjustments of the tail stock 11 will be transferred in terms of multiplied motion to the dial 50 by way of the gear rack 32, the pinion 39, the gear 42 and the pinion 47. Thus, a movement of the tail stock as little as $\frac{1}{1000}$ of an inch may be recorded along a considerable spread by means of the origin mark 52 in relation to the calibrations 53. By means of the indicator thus provided, the tail stock may receive extremely fine adjustments without any guess work or uncertainty; and when a given adjustment shows a certain calibration, it is a simple matter to reset the tail stock to the same adjustment in case an identical job is required, by recording the calibration. Needless to say, the ball bearings in the attachment are provided to ease the transfer of the multiplied motion to the indicator, adding refinement to the device. It is conceivable that the dial 50 could be supplanted by a mere pointer, but the dial is preferred because it affords a handy and easily visible surface on which to mark formulas for computing ratios of lateral adjustment in the tail stock, thus placing this information for immediate reference in connection with the indicator. Finally, it will be evident that the novel attachment forms a unit which can be applied without in any way altering the lathe or other equipment to which it is applied, being in a position out of the way and suitable for application to any machine where a lateral motion is to be interpreted on a wide scale.

While I have described the improved tail stock indicator along specific lines, various minor changes and refinements may be made without departing from its principle, and I desire to consider all such changes and refinements as coming within the scope and spirit of the appended claims.

I claim:

1. In a lathe, including a tail stock member adjustable on a base member, a rack carried by one of said members, a gear rotatably carried by the other of said members and in mesh with said rack, a fixed dial on said last member, a rotatable indicator rotatably mounted on said last member and cooperating with said dial, and a rotation multiplying gear train connecting said gear to said indicator whereby movement of said tail stock member on said base is multiplied on said dial by said indicator.

2. An attachment for a tail stock which is laterally adjustable on a base, comprising a gear rack carried by said tail stock, a gear rotatably carried by said base in mesh with said rack, a fixed dial on said base, a rotatable indicator carried by said base for cooperation with said dial, and a rotation multiplying gear train carried by said base and connecting said gear to said indicator, whereby movement of said tail stock on said base is multiplied by said indicator.

ERICK MOEN.